United States Patent [19]
Mackenzie

[11] Patent Number: 5,815,352
[45] Date of Patent: Sep. 29, 1998

[54] ARC FAULT DETECTOR WITH LIMITING OF SENSED SIGNAL TO SHAPE RESPONSE CHARACTERISTIC AND CIRCUIT BREAKER INCOPRORATING SAME

[75] Inventor: Raymond Warren Mackenzie, Pittsburgh, Pa.

[73] Assignee: Eaton Corporation, Cleveland, Ohio

[21] Appl. No.: 940,132

[22] Filed: Sep. 29, 1997

[51] Int. Cl.$^6$ .................................................. H02H 3/00
[52] U.S. Cl. .............................. 361/42; 361/87; 361/94; 361/111
[58] Field of Search .................... 361/42, 47, 49, 361/87, 78–79, 93–94, 97–102, 111; 335/201; 324/76.44, 76.45, 520, 522, 541

[56] References Cited

U.S. PATENT DOCUMENTS

| | | | |
|---|---|---|---|
| 4,376,243 | 3/1983 | Renn et al. | 219/514 |
| 4,949,214 | 8/1990 | Spencer | 361/95 |
| 5,223,795 | 6/1993 | Blades | 324/536 |
| 5,224,006 | 6/1993 | MacKenzie et al. | 361/45 |
| 5,307,230 | 4/1994 | MacKenzie | 361/96 |
| 5,452,223 | 9/1995 | Zuercher et al. | 364/483 |
| 5,459,630 | 10/1995 | MacKenzie et al. | 361/45 |
| 5,519,561 | 5/1996 | Mrenna et al. | 361/105 |
| 5,691,869 | 11/1997 | Engel et al. | 361/42 |

*Primary Examiner*—Jeffrey A. Gaffin
*Assistant Examiner*—Michael J. Sherry
*Attorney, Agent, or Firm*—Martin J. Moran

[57] ABSTRACT

An arc fault detector having a pulse generator generating a pulse each time an arc is struck includes a limiting amplifier which limits the amplitude of the pulses to discriminate against false trips from sizable singular events such as tungsten bulb burnout and turn-on of a cold tungsten lamp controlled by a phased back dimmer. When a time attenuated accumulation of the pulses reaches a predetermined level an arc fault signal which can be used to trip the circuit breaker is generated. The pulse generator of the arc fault detector includes multiple stages of high pass filtering which produces overshoot and therefore additional pulses each time an arc is struck. As only the additional pulses associated with large amplitude arcs exceed a threshold value for inclusion in the time attenuated accumulation, compensation for the reduction in sensitivity to large amplitude arcs imposed by the limiting amplitude is provided.

20 Claims, 4 Drawing Sheets

ARC FAULT DETECTOR WITH LIMITING OF SENSED SIGNAL TO SHAPE RESPONSE CHARACTERISTIC AND CIRCUIT BREAKER INCOPRORATING SAME

BACKGROUND OF THE INVENTION

1. Field of the Invention

This invention is directed to detection and interruption of arc faults in power distribution systems. More particularly, it is directed to arrangements for increasing sensitivity of the arc fault detector to arc faults while decreasing sensitivity to false arc fault indications. The invention is also directed to circuit breakers including such arc fault detectors.

2. Background Information

Conventionally, circuit breakers respond to overcurrent conditions to interrupt the flow of current in a protected circuit. The small circuit breakers commonly used for residential and light commercial applications typically have a thermal-magnetic trip device which provides this protection. This device includes a bimetal which bends in response to persistent overcurrent conditions to unlatch a spring powered operating mechanism and open the contacts. A magnetic armature is attracted by the very large currents associated with a short circuit to also unlatch the operating mechanism and trip the circuit breaker open.

Recently, there has been a growing interest in providing protection from arc faults. Arc faults are intermittent high impedance faults which can be caused for instance by worn insulation, loose connections, broken conductors, and the like. Because of their intermittent and high impedance nature, they do not generate currents of sufficient instantaneous magnitude or sufficient average current to trigger the thermal-magnetic trip device which provides the short circuit and overcurrent protection.

Various types of arc fault detectors have been proposed. One type is based on the recognition that arc faults generate a step increase in current each time the arc is struck. However, many typical loads generate a similar step increase in current. In many instances, the step increases generated by these loads are singular events, while an arc fault generates a series of step increases. The arc fault detector described in U.S. Pat. No. 5,224,006 counts step increases in current and generates a trip signal if a selected number of step increases occur within a given interval. However, there are loads, such as a solid state dimmer switch with the firing angle phased back substantially, which also generate repetitive increases in current. This problem is addressed by the arc fault detector described in U.S. Pat. No. 5,691,869, in which the sensed current signal is passed through a bandwidth limited filter which generates pulses having an amplitude proportional to the step increases. An arc indication is generated when a time attenuated accumulation of these pulses reaches a predetermined value. Thus, a few large magnitude step increases within a period of time, or a larger number of more modest step increases within a similar time period, generate a trip signal. The trip signal level can be set so that the cyclic pulses generated by a dimmer do not generate the time attenuated accumulation which reaches the trip level.

There is at least one arc condition which can occur in a protected circuit to which it is desired that the arc fault circuit not respond. This is an arc created by the burnout of a tungsten filament such as in a light bulb. When the filament burns through, a small gap is created between the burned out ends of the filament. An arc is struck across this gap and can quickly envelop the entire filament so that it extends between the two conductors thereby drawing a very large arc current. In order to terminate this arc, tungsten bulbs are provided with a small fuse in the base. Even so, burnout of the filament and blowing of the fuse results typically in a pulse of large amplitude in the pulse signal of the arc fault detector. This pulse can be of sufficient magnitude that the threshold value of the time attenuated accumulation of pulses in the circuit breaker described in U.S. Pat. No. 5,691,869, is exceeded and the circuit breaker is tripped. This is considered a nuisance trip as the fuse has interrupted the arc.

Tungsten filament bulbs can also generate false trips when used with a dimmer. As mentioned, a dimmer which is phased back can generate repetitive step increases in current on each half cycle. As also discussed, the circuit breaker can be set so that the threshold of the time attenuated accumulation of pulses generated by the dimmer do not reach the trip level with normal loads. However, when a tungsten filament lamp is first turned on, the cold filament has a very low resistance and can draw up to fifteen times normal current. This can result in a nuisance trip when a tungsten lamp controlled by a dimmer switch is first turned on.

Reducing the sensitivity to the large pulses generated by tungsten filament burnout or turn-on of a dimmer controlled tungsten bulb can unduly delay the response to true sizeable arcing faults. Also, if the overall sensitivity of the detector is reduced, the response to smaller arcing faults will also deteriorate.

There is a need for an improved arc fault detector and circuit breaker incorporating such a detector which discriminates against false arc indications such as can be caused by tungsten bulb burnout or turn-on of a dimmer controlled tungsten bulb.

There is a further need for such an improved detector and circuit breaker which maintain good sensitivity to lower amplitude arc faults.

SUMMARY OF THE INVENTION

These needs and others are satisfied by the invention which is directed to an arc fault detector and a circuit breaker incorporating the detector which has means for limiting the amplitude of the pulses generated in response to step increases in current such as are generated by arcing faults and the burnout of tungsten lamps or turn-on of a dimmer controlled tungsten bulb. More particularly, the limiting means is a limiting amplifier which limits the amplitude of pulses generated by the combination of high pass filter means and low pass filter means each time an arc is struck. When a time attenuated accumulation of the pulses so limited reaches a predetermined level, an arc signal which can be used to trip the circuit breaker is generated. Preferably, the high pass filter means includes at least two high pass filters including one high pass filter before the limiting amplifier and a second high pass filter after the limiting amplifier. This causes the pulse signal to overshoot thereby generating additional pulses. The means for generating the time attenuated accumulation of pulses includes threshold means setting a threshold which must be exceeded before the pulses are accumulated. Also preferably, the limiting amplifier comprises an operational amplifier powered by a predetermined supply voltage referenced to ground. A bias means applies a dc bias to the operational amplifier of about one-half the supply voltage to pass pulses of both polarity through the operational amplifier. The second high pass filter after the limiting amplifier includes a series capacitor which also removes this dc bias from the pulse signal before it is applied to the means generating the time attenuated accumulation of the pulses.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a miniature circuit breaker such as that described in U.S. Pat. No. 4,081,852 which is hereby incorporated by reference. That circuit breaker incorporates a thermal-magnetic trip device comprising a bimetal and a magnetic armature which unlatch a spring driven trip mechanism to open the contacts in response to a persistent overcurrent and a short circuit current, respectively. The circuit breaker of Pat. No. 4,081,852 includes a ground fault detector which can be replaced by, or be used in addition to, the arc fault detector which forms part of the present invention.

Figure 1:
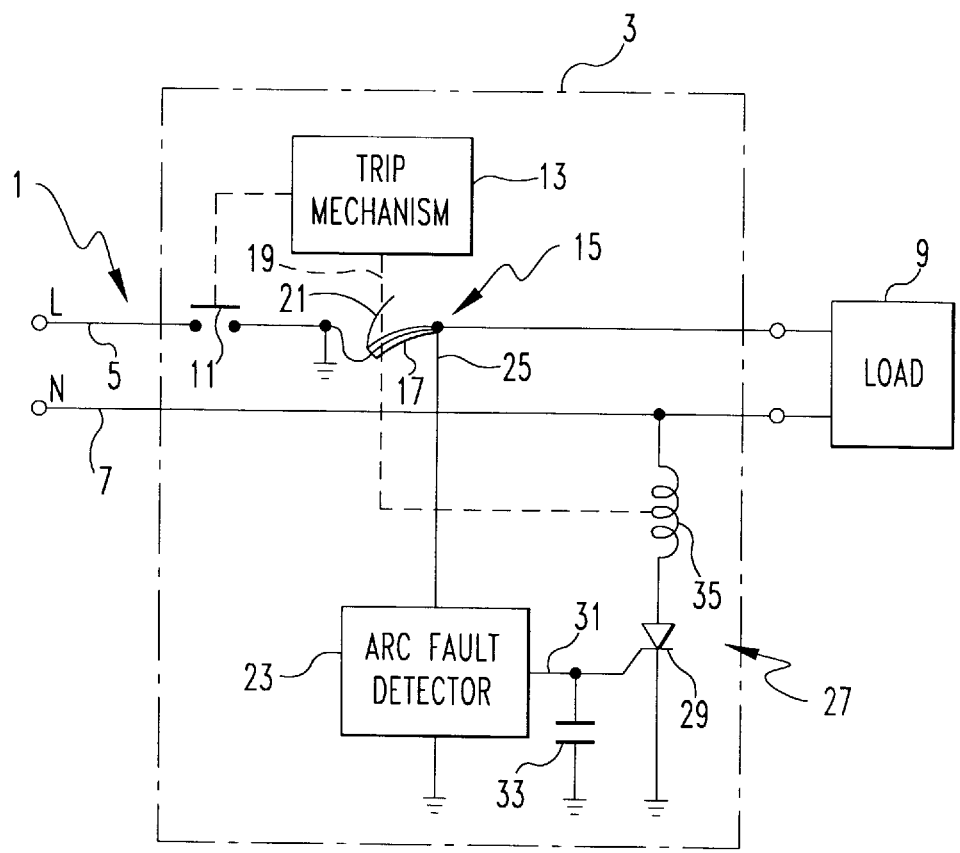
FIG. 1 is a schematic diagram partially in block form of a circuit breaker incorporating the invention.

Turning to FIG. 1, the electrical system 1 protected by the circuit breaker 3 includes a line conductor 5 and a neutral conductor 7 connected to provide power to a load 9. The circuit breaker 3 includes separable contacts 11 which can be tripped open by a spring operated trip mechanism 13. The trip mechanism may be actuated by a conventional thermal-magnetic overcurrent device 15. This thermal-magnetic overcurrent device 15 includes a bimetal 17 connected in series with the line conductor 5. Persistent overcurrents heat up the bimetal 17 causing it to bend and release a latch 19 which actuates the trip mechanism 13. Short circuit currents through the bimetal 17 magnetically attract an armature 21 which alternatively releases the latch 19 to actuate the trip mechanism 13.

In addition to the thermal-magnetic overcurrent device 15, which provides conventional protection, the circuit breaker 3 includes an arc fault detector 23. This arc fault detector 23 includes a lead 25 together with a common ground connected to sense voltage across the bimetal 17. As the resistance of the bimetal 17 is known, this voltage is a measure of the current flowing through the line conductor 5. Such a current sensor is described in U.S. Pat. No. 5,519,561. Other types of current sensors for measuring the current through the line conductor 5 could be used.

As will be discussed, the arc fault detector 23 analyzes the sensed current provided on the lead 25 and upon detection of an arc fault, generates an arc fault signal which in the case of the circuit breaker 3 is used as a trip signal to energize a trip circuit 27. The trip circuit 27 includes a silicon controlled rectifier (SCR) 29 having a gate to which the trip signal is applied on the lead 31. A capacitor 33 protects the gate of the SCR 29 from transient voltage spikes. Turn-on of the SCR 29 by the arc fault trip signal energizes a trip coil 35 connected to the neutral lead 7 of the electric power circuit. Actuation of the trip solenoid 35 releases the latch 19 to actuate the trip mechanism 13 thereby opening the separable contact 11.

Figure 2:
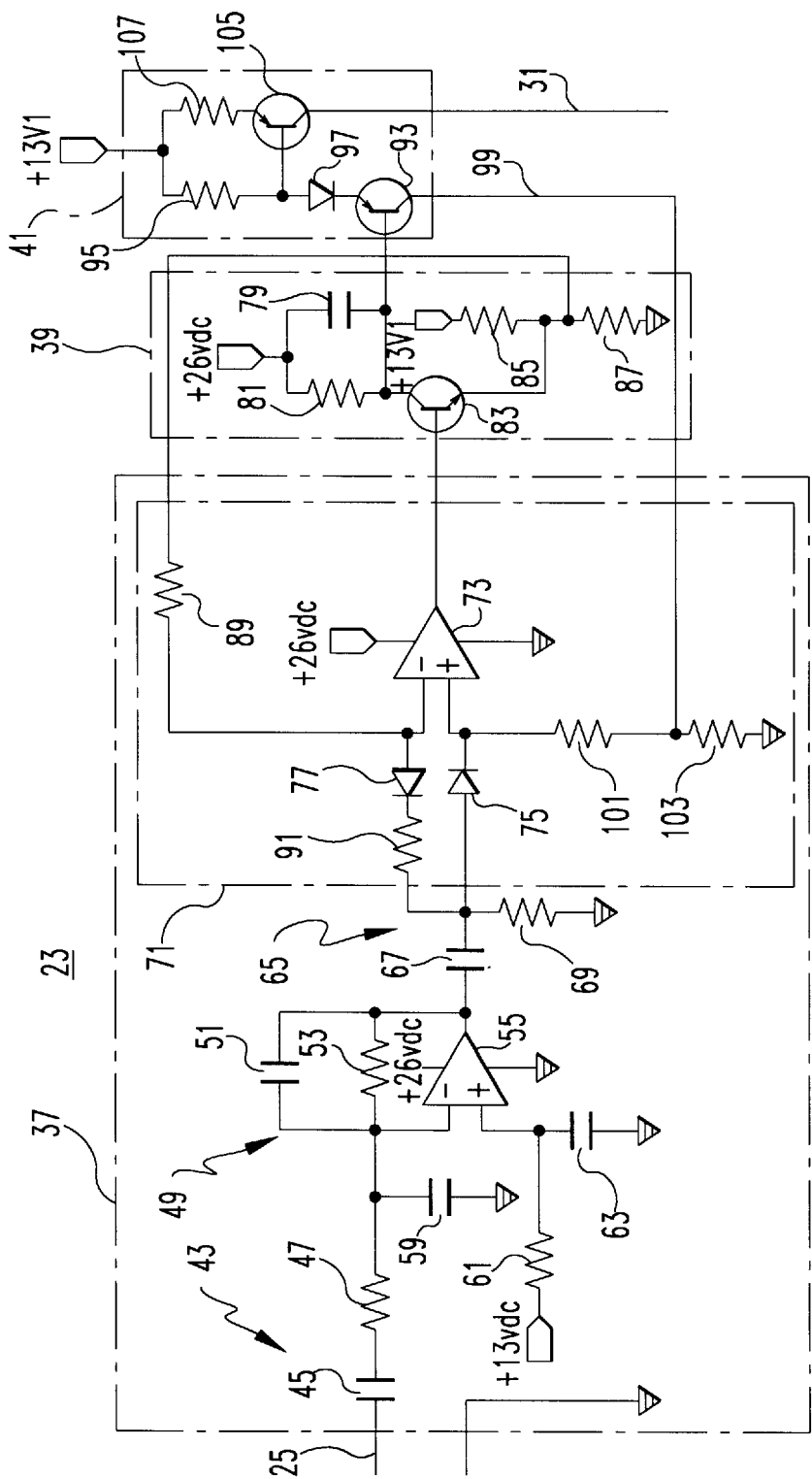
FIG. 2 is a schematic circuit diagram of the arc fault detector in accordance with the invention which is part of the circuit breaker of FIG. 1.

FIG. 2 illustrates the arc fault circuit 23. The voltage referenced to ground across the bimetal 17 which is representative of current flowing through the circuit breaker is provided on the lead 25. The arc fault circuit 23 includes a pulse generator 37, a circuit 39 which provides a time attenuated accumulation of the pulses generated by the pulse generator 37, and an output circuit 41 which provides an arc fault or a trip signal on the lead 31.

The pulse generator 37 includes a first high pass filter 43 formed by the series connected capacitor 45 and resistor 47, followed by a low pass filter 49 comprising the parallel connected capacitor 51 and resistor 53. The high pass filter 43 and low pass filter 49 have a band pass in a range which generates pulses in response to the step increases in current caused by striking of an arc. In the exemplary arc fault detector 23 this band pass is about 400 to about 590 Hz.

A limiting amplifier formed by the operational amplifier (op amp) 55 provides gain for the pulses in the pulse signal generated by the high pass filter 43 and low pass filter 49. The limiting op amp 55 is referenced to ground and powered by a 26 volt dc supply voltage. As the amplifier 55 is referenced to ground, a bias voltage equal to about one half of the supply voltage, or +13 volts dc is applied to the noninverting input. This bias allows the amplifier 55 to pass pulses of both polarity. The amplifier 55 clamps the pulse signal at +26 volts dc (the supply voltage) and zero volts dc (the ground reference voltage).

A capacitor 59 connected between the inverting input of the limiting amplifier 55 and ground reduces high frequency noise in the pulse signals. A resistor 61 and capacitor 63 provide a reduction in 60 Hz ripple present in the power supply.

Following the limiting amplifier 55 is a second high pass filter 65 formed by the capacitor 67 and resistor 69. As will be discussed, this pair of high pass filters 43 and 65 generate overshoot which is used to advantage in the invention. The capacitor 67 of the second high pass filter 65 also serves as a dc blocking capacitor so that the 13 volt dc bias is removed from the pulse signal. Thus, the pulse signal emerging from the second high pass filter 65 has positive and negative polarity pulses which are clamped at the predetermined limit value of +13 volts and −13 volts, respectively.

The bipolar pulse signal output by the second high pass filter 65 is rectified by a rectifier circuit 71 which includes another op amp 73. Positive pulses are applied to the noninverting input of the op amp 73 through a diode 75 while negative pulses are applied to the inverting input through diode 77. The output of the op amp 73 is a pulse signal having pulses of a single polarity. The circuit 39 generates a time attenuated accumulation of the pulses in the pulse signal generated by the pulse generator 37. The pulses are accumulated on a capacitor 79 connected to the 26 volt dc supply. A bleed resistor 81 connected across the capacitor 79 provides the time attenuation. The pulses are applied to the capacitor 79 through a transistor 83. When no pulses are generated, both electrodes of the capacitor 79 are at 26 volts. The pulses from the pulse generator 37 provide base drive current for the transistor 83. The voltage divider formed by the resistors 85 and 87 connected at their common connection to the emitter of the transistor 83 set the minimum amplitude for the pulses to turn on the transistor 83. This threshold is selected so that the pulses which could be generated by some normal loads, such as for instance a dimmer switch operating in normal ranges, are not accumulated. As will also be seen, this threshold eliminates some of the additional pulses generated by the multiple high pass filters.

The amplitude of the pulses is set by the gain of the operational amplifier 73 which in turn is determined by the ratio of the value of the feedback resistor 89 and an input resistor 91. The amplitude and duration of each pulse determines the amount of charge which is applied to the capacitor 79. The successive pulses are accumulated through the summation of the charge they add to the capacitor 79. The resistor 81 continuously bleeds the charge on the capacitor 79 with a time constant determined by the values of the capacitor 79 and resistor 81 to time attenuate the accumulation of the pulses. It can be appreciated that the magnitude and time interval between pulses determines the instantaneous voltage that appears across the capacitor at 79.

The output circuit 41 monitors the voltage across the capacitor 79 representing the time attenuated accumulation of the pulses in the pulse signal generated by the pulse generator 37. Each pulse lowers the voltage on the capacitor 79 which is applied to the base of a transistor 93 in the output circuit 41. Voltage is applied to the emitter of the transistor 93 by the 13 vdc supply through a resistor 95 and diode 97. With no pulses being generated by the pulse generator 37, the voltage on the base of the transistor 93 is 26 volts. Without the diode 97, the 13 volt reverse bias would destroy the base to emitter junction of the transistor 93. The diode 97 withstands this voltage. When the voltage at the lower end of the capacitor 79, and therefore on the base of the transistor 93, falls below 13 volts minus the forward drop across the diode 97, the transistor 83 is turned on. Feedback provided through the lead 99 and the resistors 101 and 103 holds the transistor 93 on by providing a continuous output of the op amp 73. Turn-on of the transistor 93 provides base drive current for the transistor 105 which draws current limited by the resistor 107 to generate an arc fault trip signal on the lead 31. The trip signal actuates the SCR 29 to trip the separable contacts 11 open in the manner previously described. The larger the pulses in the pulse signal generated by the pulse generator 37, the harder the transistor 83 is turned on, and hence, the faster charge is accumulated on the capacitor 79.

Figure 3:
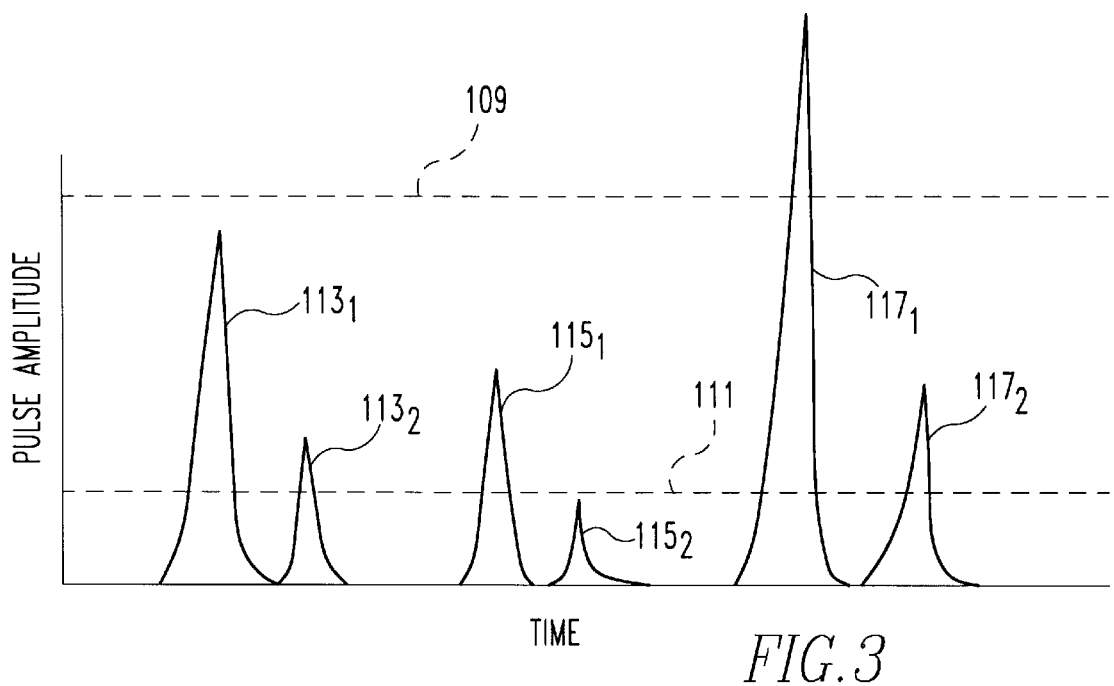
FIG. 3 is a waveform diagram illustrating operation of the arc fault circuit of FIG. 2.

FIG. 3 illustrates operation of the arc fault detector 25 in accordance with the invention. This figure illustrates waveforms of pulses generated by the pulse generating circuit 37. The predetermined limit value for pulses set by the limiting amplifier 55 is shown at 109 while the threshold established by the voltage divider formed by the resistors 85 and 87 is shown at 111. The pulse $113_1$ is a relatively large pulse generated by the striking of an arc. It can be seen that this pulse $113_1$ exceeds the threshold 111 so that it will be accumulated on the capacitor 79. Its amplitude does not exceed the limiting amplitude 109, so that all of the value of the pulse which exceeds the threshold 109 will be applied as charge to the capacitor 79. The additional pulse $113_2$ generated as a result of the two high pass filters 33 and 65, also exceeds the threshold 111, and therefore, will accumulate charge on the capacitor 79. The pulse $115_1$ represents the striking of an arc of lessor amplitude. Again, as this pulse does not exceed the limit 109 set by the amplifier 55, the full value of the pulse $115_1$ which exceeds the threshold 111 will add charge to the capacitor 79. Since the arc generating the pulse $115_1$ is smaller in amplitude, the additional pulse $115_2$ generated by this arc does not exceed the threshold 111 and therefore adds no charge to the capacitor 79. Thus, it can be seen that large amplitude arcs accumulate charge on the capacitor 79 faster not only because of their greater amplitude, but also because the additional pulses they generate exceed the threshold and also add to the accumulated charge.

The pulses $113_1$ and $113_2$ do not add sufficient charge to the capacitor 79 to generate a trip signal on their own. However, as mentioned, arc faults produce repetitive strikes. The larger arcs, which pose a greater threat of a fire or other damage will initiate a trip sooner than smaller arcs, as more of the latter are required to drive the voltage on the capacitor 79 to the predetermined trip level.

It can be appreciated from FIG. 3 that the pulses generated by the pulse generator 37 have width as well as height. As the transistor 83 remains on as long as the pulse amplitude is above the threshold 111, the capacitor 79 integrates the total area under the pulse which is above the threshold 111. This also results in faster accumulation of charge in response to the larger amplitude arcs which has the effect of applying nonlinear current/time characteristics to the response of the arc fault detector 23.

The pulse $117_1$ represents a very large pulse which can be generated by the arc fault detector 23 in response to burnout of a tungsten bulb or the first pulse generated by the turn-on of a cold tungsten bulb controlled by a dimmer switch. In this instance, the amplitude and therefore the total area under the pulse $117_1$ together with the portion of the pulse $117_2$ which exceeds the threshold 111 can add enough charge to the capacitor 79 in themselves to generate a trip. However, the limiting at the level 109 provided by the limiting amplifier 55 results in clipping the pulse $117_1$ so that the total charge applied to the capacitor 79 by the clipped pulse $117_1$ and the pulse $117_2$ is insufficient to raise the voltage on the capacitor to the trip level.

Figure 4A:
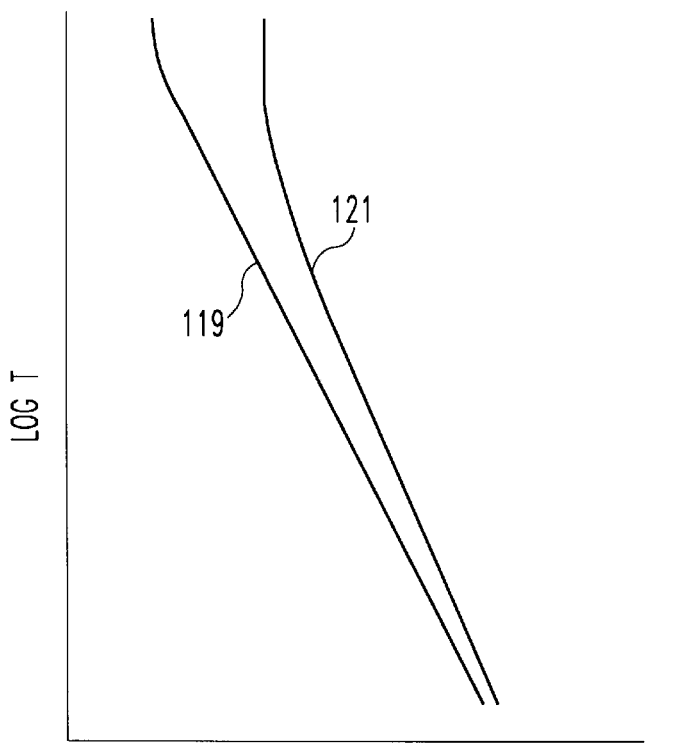
FIGS. 4a–4c are diagrams illustrating the effects of the invention on the current/time response characteristic of the arc fault detector of FIG. 2.
Figure 4B:
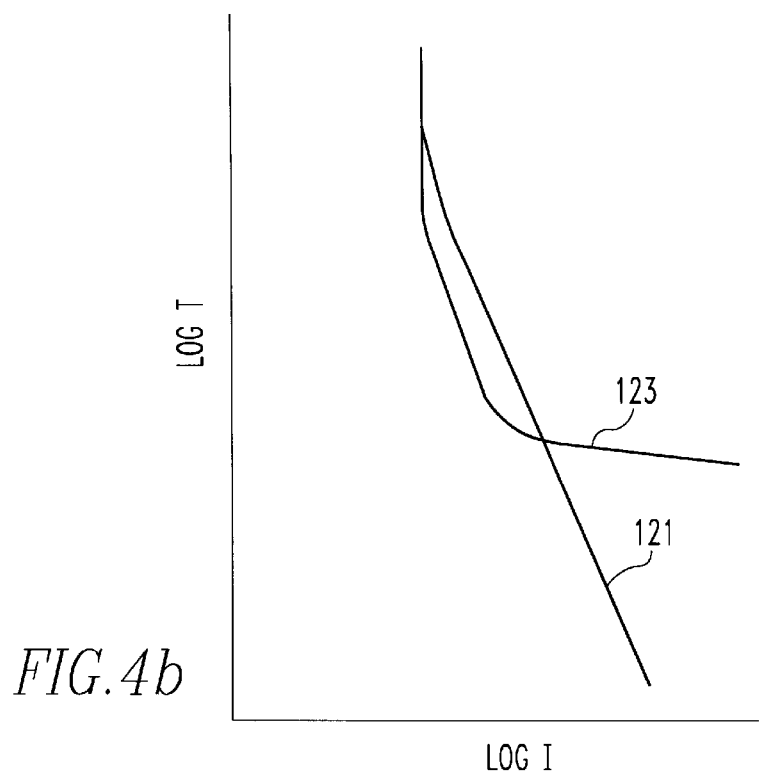
Figure 4C:
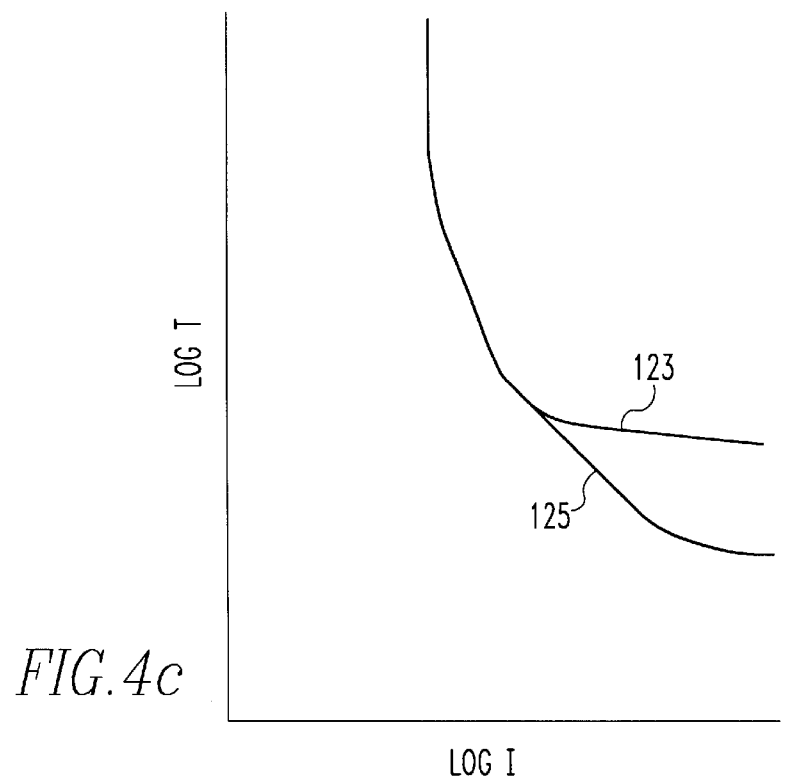

FIGS. 4a–4c illustrate how the limiting provided by the limiting amplifier 55, the threshold provided by the voltage divider formed by the resistors 85 and 87 and the additional pulses generated by the multistage high pass filter affect the response of the arc fault detector circuit 23.

FIG. 4a shows the basic shape of the curve 119 produced by integration of the pulses by the capacitor 79. This curve is basically square-law, then becoming steeper at some very low value of current, due to the discharge of the integrating capacitor 79 by the resistor 81. The rate of discharge is chosen to cause a relatively slow discharge of the capacitor 79, but can not also cause the threshold to occur at the desired current level. Therefore, a threshold is provided by the resistors, 85 and 87. The threshold also moves the entire curve as shown at 121, but has the most effect at lower currents.

FIG. 4b shows the preceding curve 121 with the threshold, compared to the curve 123 representing the effect of the addition of the limiting amplifier 55. In addition to adding the limiter, the gain has been increased, and the values of the resistors, 85 and 87, have then been altered to restore the value of the threshold current to its original value.

FIG. 4c shows the preceding curve 123 with limiting compared to the curve 125 showing the effect of the addition of the second high-pass filter section 65. This causes the sensitivity of the high current end of the curve to increase, but not to its original value when compared to the curve 119. The object of the curve reshaping was to increase the low current sensitivity, while decreasing the high current sensitivity. The second high-pass section 65 serves another purpose, that of decreasing the sensitivity of the circuit to 60 Hz sinusoidal load currents; thus, omitting the second high-pass section would result in too much sensitivity to 60 Hz currents, especially in view of the fact that the gain had to be increased to obtain sufficient sensitivity at lower values of arcing current. The resultant curve 125 illustrates that the arc detector 23 responds more quickly to low level arcing faults while maintaining good response to high amplitude arcing faults without falsely tripping on other phenomenon generating high amplitude step increases in current such as tungsten bulb burnout or turn-on of a cold tungsten bulb controlled by a dimmer.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. Apparatus for detecting arc faults in an electric power circuit, said apparatus comprising:
    sensing means sensing current in said electric power circuit to generate a sensed current signal;
    a pulse generator generating a pulse signal containing at least one pulse each time an arc is struck in said electric power circuit;
    limiting means limiting amplitude of said pulses in said pulse signal to a predetermined limit value;
    means generating a time attenuated accumulation of said pulses in said pulse signal; and
    output means generating an arc signal when said time attenuated accumulation reaches a predetermined level.

2. The apparatus of claim 1 wherein said pulse generator comprises:
    high pass filter means and low pass filter means filtering said sensed current signal to generate said pulse signal containing at least one pulse each time an arc is struck in said electric power circuit.

3. The apparatus of claim 2 wherein said limiting means comprises a limiting amplifier which limits the amplitude of said pulses.

4. The apparatus of claim 3 wherein said limiting amplifier comprises an operational amplifier and wherein said low pass filter is connected in a feedback path of said operational amplifier.

5. The apparatus of claim 3 wherein said limiting amplifier comprises an operational amplifier having a predetermined supply voltage and a ground reference, and bias means applying a dc bias to said operational amplifier of about one-half said supply voltage to pass pulses of both positive and negative polarity through said operational amplifier, and means following said operational amplifier to remove said dc bias from said pulse signal.

6. The apparatus of claim 3 wherein said high pass filter means comprises at least two high pass filters generating undershoot and therefore additional pulses in said pulse signal each time an arc is struck in said electric power circuit.

7. The apparatus of claim 6 wherein said means generating a time attenuated accumulation of said pulses in said pulse signal includes threshold means setting a threshold value for said pulses and means accumulating the portion of said pulses which exceeds said threshold value.

8. The apparatus of claim 7 wherein said threshold means sets said threshold value to eliminate said additional pulses below a selected amplitude and which threshold value is below said predetermined limit value of the amplitude of said pulses.

9. The apparatus of claim 8 wherein said limiting means comprises an operational amplifier having a predetermined supply voltage and a ground reference, and bias means applying a dc bias to said operational amplifier of about one-half said supply voltage to pass pulses of both positive and negative polarity through said operational amplifier, and wherein said second high pass filter includes a series capacitor which also removes said dc bias from said pulse signal.

10. The apparatus of claim 9 wherein said means generating said time attenuated accumulation of said pulses comprises rectifier means generating a unipolar pulse signal from said pulse signal, a capacitor to which said unipolar pulse signal is applied in a first sense to generate an accumulation of said pulses, and means adjusting charge on said capacitor in a sense opposite to the sense of said unipolar pulse signal to provide time attenuation of said accumulation, and wherein said output means generates said arc signal when voltage on said capacitor reaches a selected level.

11. A circuit breaker for providing protection against arc faults in an electric power circuit, said circuit breaker comprising:
    separable contacts interrupting current in said electric power circuit when open;
    operating means opening said separable contacts in response to a trip signal; and
    arc fault detecting means comprising:
        sensing means sensing current in said electric power circuit to generate a sensed current signal;
        a pulse generator generating a pulse signal containing at least one pulse each time an arc is struck in said electric power circuit;
        a limiting amplifier limiting amplitude of said pulses in said pulse signal to a predetermined limit value;
        means generating a time attenuated accumulation of said pulses in said pulse signal; and
        trip means generating a trip signal when said time attenuated accumulation reaches a preselected value.

12. The circuit breaker of claim 11 wherein said pulse generator comprises:
    high pass filter means and low pass filter means filtering said sensed current signal to generate said pulse signal containing at least one pulse each time an arc is struck in said electric power circuit.

13. The circuit breaker of claim 12 wherein said high pass filter means comprises at least two high pass filters generating undershoot and therefore additional pulses in said pulse signal each time an arc is struck in said electric power circuit, and wherein said means generating a time attenuated accumulation of said pulses in said pulse signal includes threshold means setting a threshold value for pulses which are accumulated, said threshold value being set that so that only said additional pulses having an amplitude above said threshold value are accumulated.

14. The circuit breaker of claim 13 wherein said at least two high pass filters includes a first high pass filter before said limiting amplifier and second high pass filter after said limiting amplifier and wherein said limiting amplifier comprises an operational amplifier having a predetermined supply voltage and a ground reference, and bias means applying a dc bias to said operational amplifier of about one-half said supply voltage to pass pulses of both positive and negative polarity through said operational amplifier, and wherein said second high pass filter includes a series capacitor which also removes said dc bias from said pulse signal.

15. Apparatus for detecting arcing faults in an electric power circuit, said apparatus comprising:

sensing means sensing current in said electric power circuit to generate a sensed current signal;

high pass filter means and low pass filter means filtering said sensed current signal to generate a pulse signal with at least one pulse each time an arc is struck in said electric power circuit;

said high pass filter means comprising at least two high pass filters generating undershoot and therefore additional pulses in said pulse signal each time an arc is struck in said electric power circuit;

means generating a time attenuated accumulation of said pulses in said pulse signal; and output means generating an arc signal when said time attenuated accumulation reaches a predetermined level.

16. The apparatus of claim 15 wherein said means generating a time attenuated accumulation of said pulses in said pulse signal includes threshold means setting a threshold value for said pulses and means accumulating the portion of said pulses which exceeds said threshold value.

17. The apparatus of claim 16 wherein said threshold means sets said threshold value to eliminate said additional pulses below a selected amplitude.

18. A circuit breaker for providing protection against arc faults in an electric power circuit, said circuit comprising:

separable contacts interrupting current in said electric power circuit when open;

operating means opening said separable contacts in response to a trip signal; and arc fault detecting means comprising:

sensing means sensing current in said electric power circuit to generate a sensed current signal;

high pass filter means and low pass filter means filtering said sensed current signal to generate a pulse signal containing at least one pulse each time an arc is struck in said electric power circuit, said high pass filter means including at least two high pass filters generating undershoot and therefore additional pulses in said pulse signal each time an arc is struck in said electric power circuit;

means generating a time attenuated accumulation of said pulses in said pulse signal; and trip means generating a trip signal when said time attenuated accumulation reaches a preselected value.

19. The circuit breaker of claim 18 wherein said means generating a time attenuated accumulation of said pulses in said pulse signal includes threshold means setting a threshold value for said pulses, and means accumulating the portion of said pulses which exceeds said threshold value.

20. The circuit breaker of claim 19 wherein said threshold means sets a threshold value to eliminate said additional pulses below a selected amplitude.

\* \* \* \* \*